United States Patent [19]

Kellogg

[11] 3,997,034
[45] Dec. 14, 1976

[54] DISC BRAKE SLIDING CALIPER MOUNTING

[75] Inventor: George Edward Kellogg, Bougival, France

[73] Assignee: General Motors Corporation, Detroit, Mich.

[22] Filed: Mar. 27, 1975

[21] Appl. No.: 562,850

[30] Foreign Application Priority Data

Mar. 28, 1974 United Kingdom ............ 13743/74

[52] U.S. Cl. .............................. 188/73.3; 188/73.1
[51] Int. Cl.² ...................................... F16D 55/224
[58] Field of Search ............... 188/71.1, 72.4, 72.5, 188/73.1, 73.3, 73.6, 250 B, 250 F

[56] References Cited

UNITED STATES PATENTS

| | | | |
|---|---|---|---|
| 3,199,635 | 8/1965 | Bessler et al. ..................... | 188/73.3 |
| 3,256,959 | 6/1966 | Eggstein ............................ | 188/73.6 |
| 3,374,866 | 3/1968 | Miles ................................. | 188/73.3 |
| 3,525,420 | 8/1970 | Honick et al. ..................... | 188/72.4 |
| 3,628,639 | 12/1971 | Daley ................................ | 188/73.3 |
| 3,682,277 | 8/1972 | Brown .............................. | 188/73.3 |
| 3,688,876 | 9/1972 | Hirai et al. ........................ | 188/73.3 |
| 3,800,923 | 4/1974 | Rike ................................. | 188/73.6 |
| 3,917,032 | 11/1975 | Hoffman et al. .................. | 188/73.3 |

FOREIGN PATENTS OR APPLICATIONS

| | | | |
|---|---|---|---|
| 258,146 | 2/1967 | Austria ............................. | 188/73.6 |
| 1,372,574 | 4/1964 | France ............................. | 188/71.1 |

*Primary Examiner*—Trygve M. Blix
*Assistant Examiner*—Edward R. Kazenske
*Attorney, Agent, or Firm*—D. D. McGraw

[57] ABSTRACT

A disc brake caliper assembly has the caliper slidably mounted on pins mounted in a non-rotary carrier. The pins lie on one side only of the disc within the projected circumference of the disc, and are secured directly to the non-rotary carrier, thus avoiding the use of a conventional bracket, so saving weight and providing a compact assembly.

1 Claim, 8 Drawing Figures

DISC BRAKE SLIDING CALIPER MOUNTING

This invention relates to disc brake slidable caliper assemblies suitable for automotive vehicles.

Caliper assemblies are known in which the caliper is slidable on fixed pins, spaced approximately tangentially of the disc, which are located radially outside the circumference of the disc and cross its periphery. These pins were fixed to a bracket having a part extending radially inwards alongside the disc and bolted or otherwise secured at its radially-inner end to a fixed part of the vehicle. In the case of a front brake, this part would be integral with the stub axle or steering knuckle.

A disc brake caliper assembly according to the present invention comprises a rotary disc, a non-rotary carrier having fixed to it a pair of spaced pins extending parallel to the disc axis and within the projected circumference of the disc, and a caliper mounted on the pins for slidable movement along them on braking action and supporting two brake pads adjacent the respective sides of the disc, one pad being directly movable into contact with one face of the disc so as by reaction to effect sliding movement of the caliper to apply the other pad to the other face of the disc; the arrangement being such that the braking torque reaction is transmitted from the pads to the caliper and thence to the pins.

A disc brake caliper assembly according to the present invention does not require such a non-rotary bracket. The pins can be fixed directly to a non-rotary part of the vehicle adjacent the centre of the disc, for example a steering knuckle, with the caliper assembly slidably mounted on the pins. Weight is saved, since no bracket is required, and the size of the brake may be reduced as no provision has to be made for a bracket, so easing the problems of the vehicle designer.

The appended claims define the scope of the monopoly claimed. How the invention can be performed is hereinafter particularly described with reference to the accompanying drawings, in which:

Figure 1:
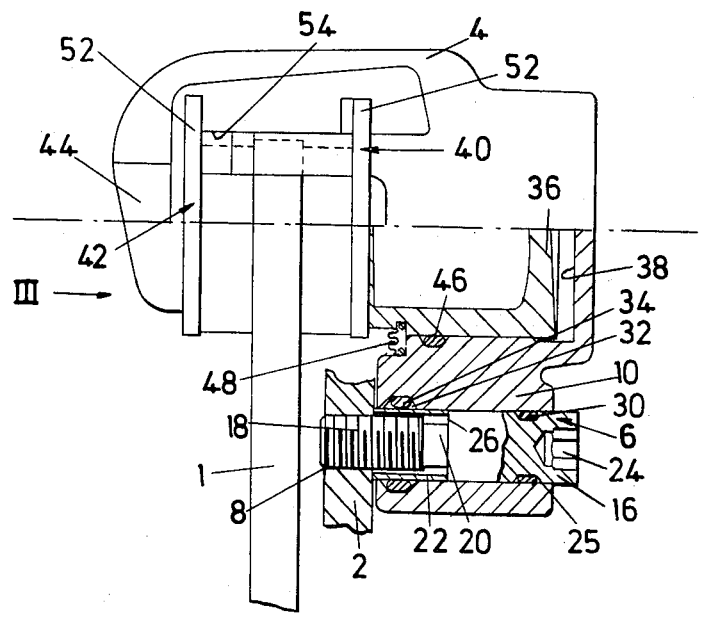
FIG. 1 is a part-sectioned end view of a disc brake caliper assembly according to the invention.
Figure 2:
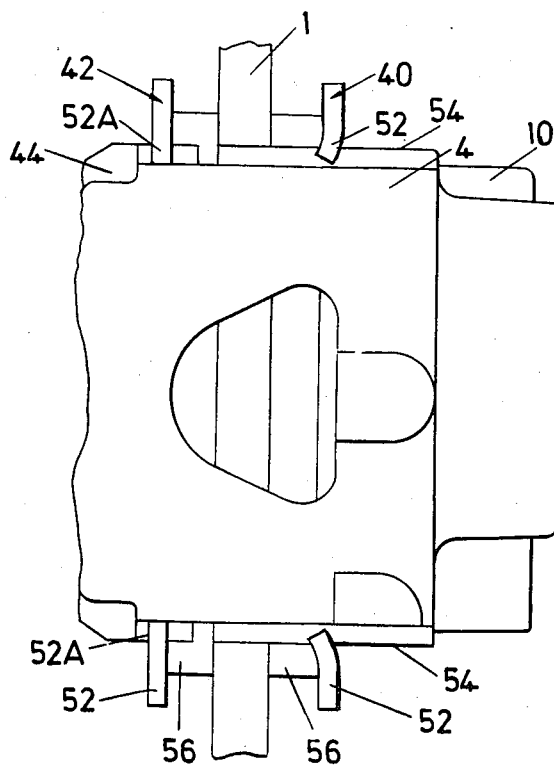
FIG. 2 is a top plan view of the assembly of FIG. 1.

The assembly includes a rotary disc 1, fixed to a wheel of the vehicle (not shown), and a non-rotary carrier 2 located at one side of the disc, and the caliper 4 mounted on a pair of pins 6 screwed into holes 8 in the carrier 2. The pins, one only being shown in FIG. 1, are spaced apart chordally of the disc 1, extend parallel to the rotary axis of the disc, and lie within the projected circumference of the disc; they are therefore on one side only of the disc. The non-rotary carrier 2, part only of which is shown in FIG. 1, may be part of a steering knuckle in the case of a front wheel brake.

The caliper 4 straddles a portion of the disc 1 and is mounted on the pins 6 for sliding movement in directions substantially parallel to the rotational axis of the disc 1.

The caliper 4 has a limb 10 from which extend two lugs 12. Each lug has a through aperture 14 in which one of the pins 6 is slidably received for mounting the caliper to the carrier 2. As seen from FIGS. 3 and 4 the lugs are spaced so that they lie chordally of the brake disc 1 when the caliper is secured to the carrier 2.

Figure 5:
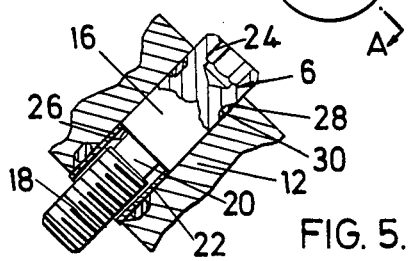
FIG. 5 is a sectioned view of a detail of FIG. 4 along the line A—A of that FIGURE.

The pins 6 are alike, and the one shown in FIGS. 1 and 5 will now be described. The pin 6 has two shank portions 16, 18 separated by an intermediate portion 20. Portion 16 has a greater diameter than portion 18 and is a sliding fit in the through aperture 14 into which it is inserted for mounting the caliper to the carrier 2. The other portion 18 of the pin is threaded, and a sleeve 22 which is a sliding fit in the through aperature 14 is placed over a part of the portion 18 and is also slidable on the shank portion 18.

The caliper 4 is positioned to straddle the brake disc 1, the pins 6 are inserted into the through apertures 14 aligned with the holes 8 in the carrier 2, and the threaded shank portions 18 on the pins are then screwed into the holes 8 to mount the caliper to the carrier. Each pin has a hexegon socket 24 formed in the free or head end of the shank portion 16 to receive a key for screwing the pin into the hole 8. As each pin is screwed into the holes 8 so the end face 26 of the shank portion 16 at the junction with the intermediate portion 20 engages the sleeve 22 and pushes it against the carrier 2. The sleeves resist any further movement of the pins 6 into the holes 8 and cause the pins 6 to stretch at the waisted section 20 and serve as stops ensuring that the pins 6 are screwed into the carrier to the desired extent and so do not protrude so far from the carrier as to foul the brake disc 1. The elongation of the pins due to the stretching at the section 20 ensures that the pins remain tight throughout their service life.

Each pin 6 has, adjacent the head of shank portion 16, a circumferential groove 28 in which is fitted a resilient seal ring 30 to prevent dirt and moisture seeping in between the pin and the wall of the through aperture 14 and to provide positive retraction of the outboard brake pad after brake application.

The caliper limb 10 has a circumferential groove 32 formed in the wall of each through hole 14 at the inboard end of the aperture, that is the end nearer the carrier 2 when the caliper is mounted to the carrier. A resilient ring 34 is fitted in this groove and bears against the sleeve 22 when the pin is fitted in the aperture 14 so as to resiliently support the caliper on the pin. This ring acts like ring 30 to return the caliper 4 after braking as will be explained later.

A piston 36 is slidable in a cylinder 38 forming part of limb 10 of the caliper. The cylinder has an inlet (not shown) by which it may be connected to an hydraulic fluid circuit (not shown). A brake pad 40 is carried on the caliper adjacent the limb 10 and is acted upon by the piston 36. A like brake pad 42 is fixed on a limb 44 of the caliper and facing pad 40.

When fluid under pressue is supplied to the cylinder the brake pad 40 is applied directly to one face of the disc 1. By reaction and the resultant sliding of the caliper 4 on the pins 6 the brake pad 42 is applied to the other side of the disc. The cylinder has a resilient seal ring 46 which also acts to provide a return spring-loading for the piston; and a dust "boot" 48.

The sliding movement of the caliper on the pins to apply the brake pad 42 to the disc 1 distorts the resilient rings 30, 34 which try to return to their undistorted state. Once brake application has ceased these rings can return to their undistorted state and in so doing move the caliper back along the pins to substantially its position before braking took place.

Figure 3:
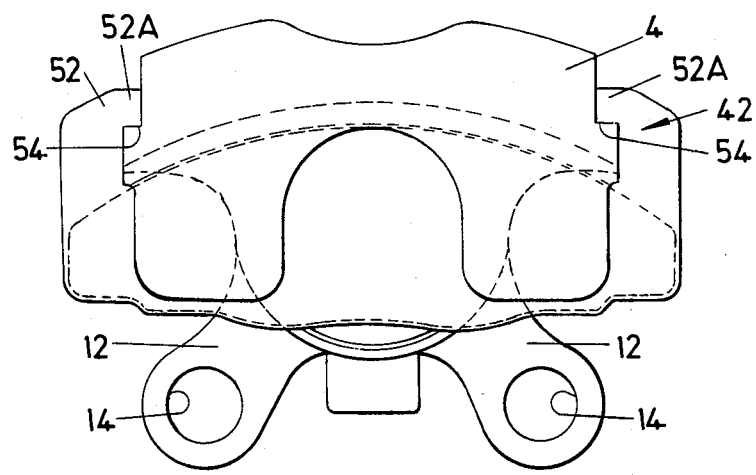
FIG. 3 is a side view with some parts omitted of the assembly of FIG. 1 taken in the direction of the arrow III.
Figure 4:
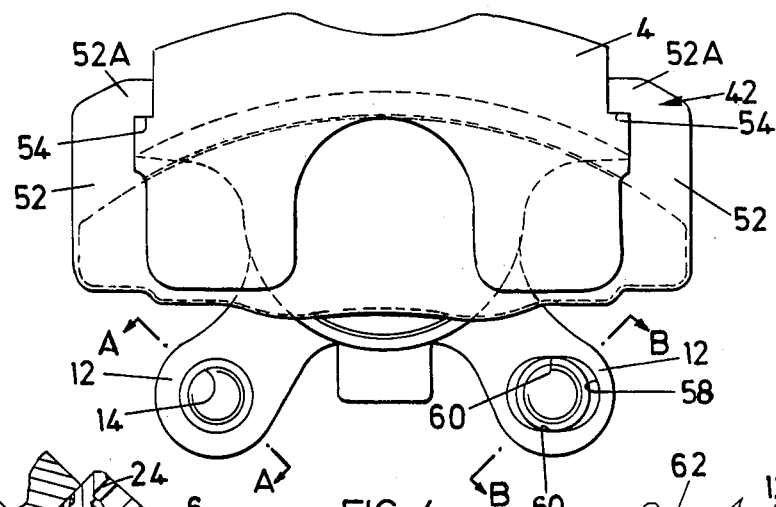
FIG. 4 is a view similar to FIG. 3, but showing a different pin-receiving aperture.
Figure 7:
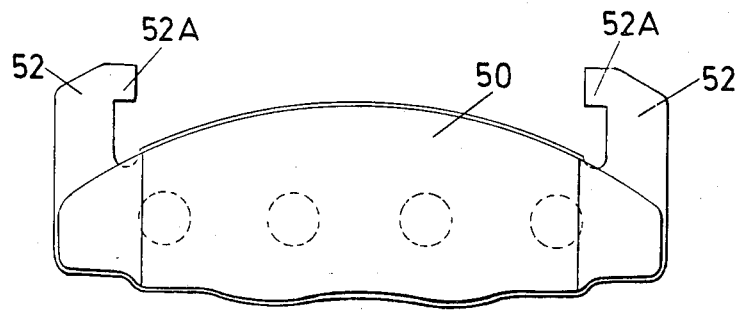
FIG. 7 is a side view of a brake pad for the assembly according to the invention.
Figure 8:
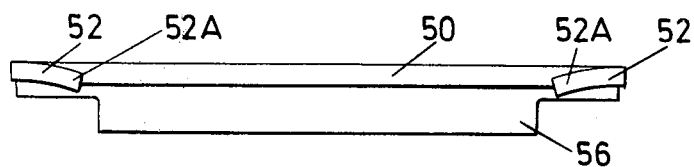
FIG. 8 is a top plan view of the pad of FIG. 7.

The brake pads 40, 42 are supported by the caliper on opposite faces of the disc 1. Each of the pads may have the same construction of backing plate 50 as shown in FIGS. 7 and 8. This includes ends 52 having ears 52A which rest on guide surfaces in the form of two ledges 54 one at each end of the caliper 4 (FIGS. 3, 4). These ledges as seen in FIG. 1 extend from one limb to the other of the caliper substantially parallel to the rotational axis of the disc 1. The backing plate ears 52A as seen in FIG. 8 are bent so as to overlie the friction material 56 secured to the backing plate. These ears are long enough so that when those on the pad 42 are returned to a straight condition during assembly, they clinch tight to the limb 44 and so retain the pad tightly on the caliper. The other pad 40, acted on by the piston 36, is required to slide on the guide surfaces formed by the ledges 54 and so its ears 52A are not returned to the straight condition. Thus one pattern of brake pad can be used for either pad 40, 42 so simplifying manufacture and assembly.

Brake torque is transmitted by the ends 52 of the backing plates of the pads 40, 42 to the adjacent end surface of the caliper and is transmitted from the caliper directly to the pins 6 and so to the carrier 2.

FIG. 4 shows at the right-hand lug 12 an alternative form of through aperture for the pin, here designated 62. This aperture 58 is non-circular to the extent that it is provided with two opposed flats 60 against which the pin 62 absorbs braking torque reaction, on rotation of the disc in FIG. 4.

Figure 6:
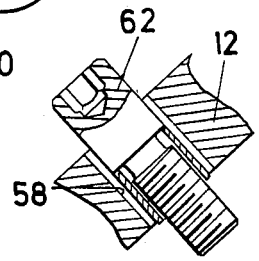
FIG. 6 is a sectioned view of a detail of FIG. 4 along the line B—B of that Figure.

The pin 62 as shown in part in FIG. 6 differs from the pins 6 in that it does not have the circumferential grooves to receive the rings. With this construction, the flats 60 are so disposed relative to the caliper limb as to provide properly oriented surfaces against which the pin can absorb brake torque, and by virtue of this contact being no more than line contact is the equal of sapced abutting surface and thus not subject to corrosion bonding between the pin and the non-circular hole. As shown in FIG. 4 this construction may be used for one pin and aperture while the other is as described first. The pin 62 is shorter than the pin 6 and is used in one of the apertures when there is less clearance available in the assembly and so avoids any danger of the pin fouling an adjacent part of the carrier.

I claim:
1. A disc brake assembly comprising:
a rotary disc;
a non-rotary carrier having two spaced apart threaded apertures therein extending axially parallel to the axis of rotation of said disc;
a pair of spaced apart pins, each pin having a threaded end portion threadedly engaged in one of said apertures to secure said pins to said non-rotary carrier, each pin having a portion extending from said non-rotary carrier in a direction away from a side surface of said disc and parallel to said axis of rotation of said disc and lying within the projected circumference of said disc, one of said pins having intermediate its length a circumferential groove formed therein;
a resilient ring accommodated in said groove and extending radially of said pin from said groove; a caliper having a body including a spaced pair of limbs interconnected by a bridge portion with one limb defining a cylinder connectible to a source of pressure fluid, guide surfaces including ledges at each side of said bridge portion between said limbs, and two lugs one on each side of said cylinder, each lug having a through aperture formed therethrough, each aperture slidably receiving one of said pins whereby said caliper is slidably mounted to said non-rotary carrier;
a piston slidably mounted within said cylinder and co-acting therewith to define brake actuating means;
two brake pads of one pattern carried by said caliper, one pad adjacent said side surface of said disc, and the other pad adjacent a side surface of said disc opposite the said side surface, each of said brake pads including a backing plate and a lining segment;
each of said backing plates having ears arranged to rest on said ledges with the space between said ears being dimensioned such that when said ears are within the surface planes of their respective backing plate said ears clinch tightly to said caliper bridge portion, the ears of one of said brake pads being bent out of the planes of its backing plate surfaces to permit said one brake pad to slide on said ledges, the ears of the other of said brake pads clinching tightly to said caliper bridge portion adjacent one limb with the backing plate thereof in brake applying force engagement with said one limb, said arrangement permitting the use of one brake pad pattern for both brake pads;
actuation of said brake actuating means being effective to move directly one of said pads into braking engagement with the side surface of the disc adjacent said pad and by reaction to effect sliding of said caliper on said pins to apply said other pad to the adjacent side surface of the disc, sliding of said caliper during braking actuation deforming said resilient ring and by said deformation providing a return force for said caliper upon cessation of brake actuation;
said pin having the resilient ring thereon having a circular cross-section, the aperture in said lug in which said pin is received being so formed as to have a complementary circular cross-section, said other pin being received in its respective aperture in said other lug and said aperture being defined so as to have two opposed flats in a substantially circular boundary of said aperture, against which flats the pin bears to absorb braking torque reaction.

* * * * *